United States Patent
Tsutsui et al.

[11] Patent Number: 6,090,508
[45] Date of Patent: Jul. 18, 2000

[54] OPTICALLY ANISOTROPIC RECORDING MEDIUM AND METHOD OF RECORDING AND ERASING INFORMATION USING THE SAME

[75] Inventors: Kyoji Tsutsui, Mishima; Akio Kojima, Mitaka; Masafumi Ohta, Susono; Ryohei Miyake, Numazu, all of Japan

[73] Assignee: Ricoh Company, Ltd., Tokyo, Japan

[21] Appl. No.: 08/919,424

[22] Filed: Aug. 27, 1997

Related U.S. Application Data

[63] Continuation of application No. 08/686,456, Jul. 25, 1996, abandoned, which is a continuation of application No. 08/340,187, Nov. 14, 1994, abandoned, which is a continuation of application No. 08/056,604, May 3, 1993, abandoned, which is a continuation of application No. 07/362,027, Jun. 6, 1989, abandoned.

[30] Foreign Application Priority Data

| Jun. 7, 1988 | [JP] | Japan | 63-140073 |
| Aug. 22, 1988 | [JP] | Japan | 63-208817 |
| Apr. 13, 1989 | [JP] | Japan | 1-094438 |
| Apr. 28, 1989 | [JP] | Japan | 1-110358 |
| Apr. 28, 1989 | [JP] | Japan | 1-110360 |

[51] Int. Cl.[7] ................................................. B41M 5/25
[52] U.S. Cl. ...................... 430/20; 430/945; 430/19; 428/913; 349/22
[58] Field of Search .................................. 428/185, 913, 428/914; 503/206, 217; 349/20–22; 430/19, 20, 945, 270.1

[56] References Cited

U.S. PATENT DOCUMENTS

| Re. 31,715 | 10/1984 | Coates et al. | 359/43 |
| 3,666,948 | 5/1972 | Mechlowitz et al. | 359/43 |
| 3,789,225 | 1/1974 | Leder | 359/43 |
| 4,264,986 | 4/1981 | Willis | 430/270 |
| 4,268,413 | 5/1981 | Debisch et al. | 252/408 |
| 4,297,417 | 10/1981 | Wu | 430/19 |
| 4,405,993 | 9/1983 | Kahn et al. | 365/108 |
| 4,477,151 | 10/1984 | Mash | 349/22 |
| 4,548,889 | 10/1985 | Nemoto et al. | 430/495 |
| 4,695,528 | 9/1987 | Dabisch et al. | 430/290.1 |
| 4,752,820 | 6/1988 | Kuroiwa et al. | 365/108 |
| 4,767,696 | 8/1988 | Ishimoto et al. | 430/270.2 |
| 4,865,648 | 9/1989 | Kito et al. | 503/217 |
| 4,883,741 | 11/1989 | Takahashi et al. | 430/495 |
| 4,950,579 | 8/1990 | Debe et al. | 430/495 |
| 4,963,448 | 10/1990 | Ichimura et al. | 430/20 |
| 4,974,941 | 12/1990 | Gibbons et al. | 359/45 |
| 4,977,030 | 12/1990 | Hotta et al. | 428/195 |
| 5,097,463 | 3/1992 | Wagenblast et al. | 365/108 |

FOREIGN PATENT DOCUMENTS

| 5994734 | 5/1984 | Japan | 430/19 |

OTHER PUBLICATIONS

Melchios et al. "Thermally addressed electrically erased . . . " Appl. Phys. lett. 21 (8) pp 392–4 (Oct. 1972).
Melchior et al, "Thermally adressed electrically erased high–resolutions liquid crystal light valves." Appl. phys lett (Oct. 1972) pp. 392–394.

*Primary Examiner*—Martin Angebranndt
*Attorney, Agent, or Firm*—Cooper & Dunham LLP

[57] ABSTRACT

An optically anisotropic recording medium and a method of recording and erasing method using the recording medium are disclosed, which comprises the steps of applying heat or light to the recording medium which comprises a recording layer made of optically anisotropic organic thin-film-shaped crystals to raise the temperature of an organic material or which comprises the optically anisotropic organic thin-film-shaped crystals to a recording temperature at which the crystals are fused, performing partial changing of the crystalline state of the crystals by rapidly cooling the recording layer, thereby recording information in the recording layer; and heating the recording layer to an erasing temperature which is lower than the recording temperature, at which the crystals are not fused, but the molecules thereof can be thermally moved.

16 Claims, 12 Drawing Sheets

×1000

← 3mW

← 2mW

← 1.5mW

×1000 x 500 x 500

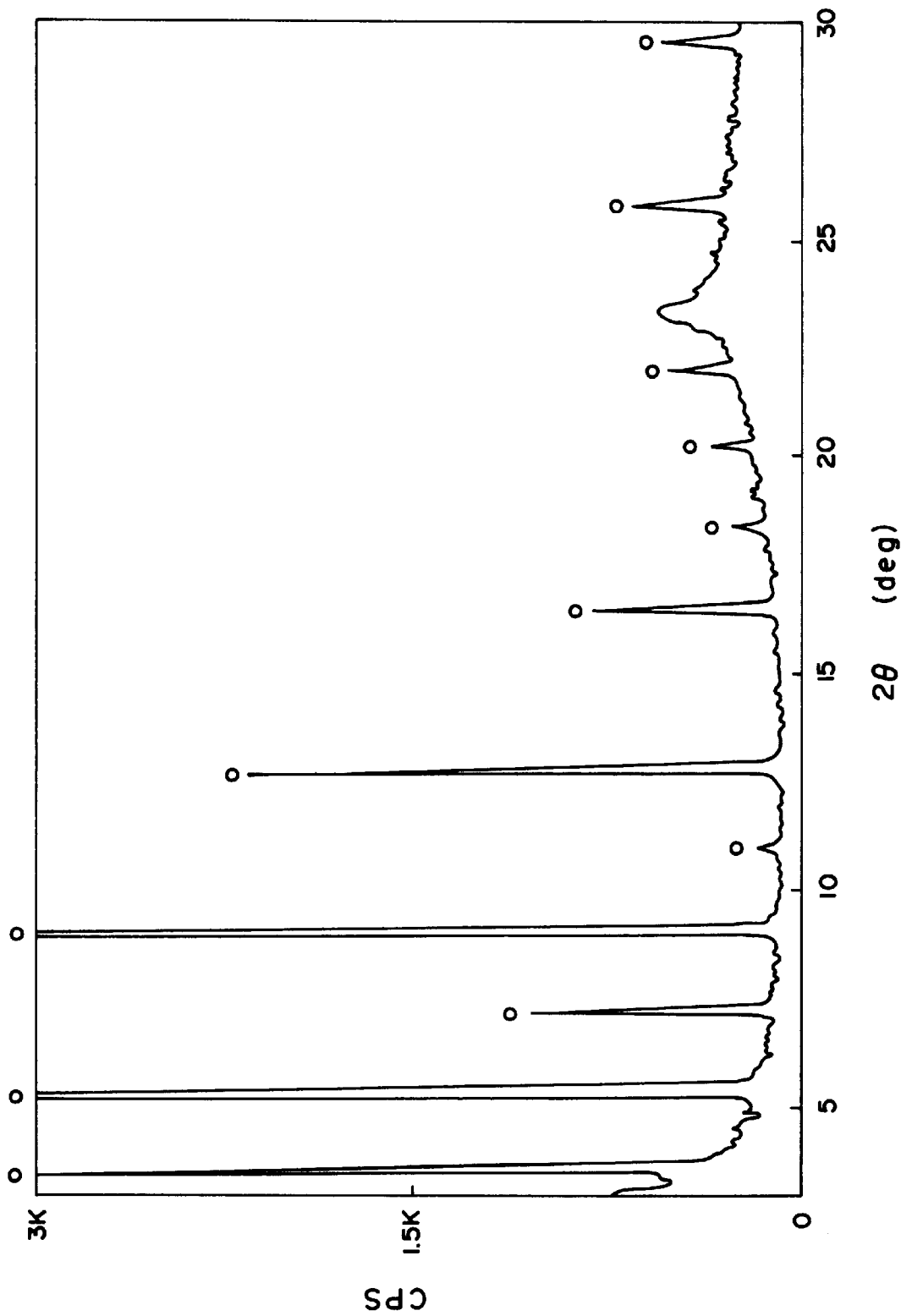

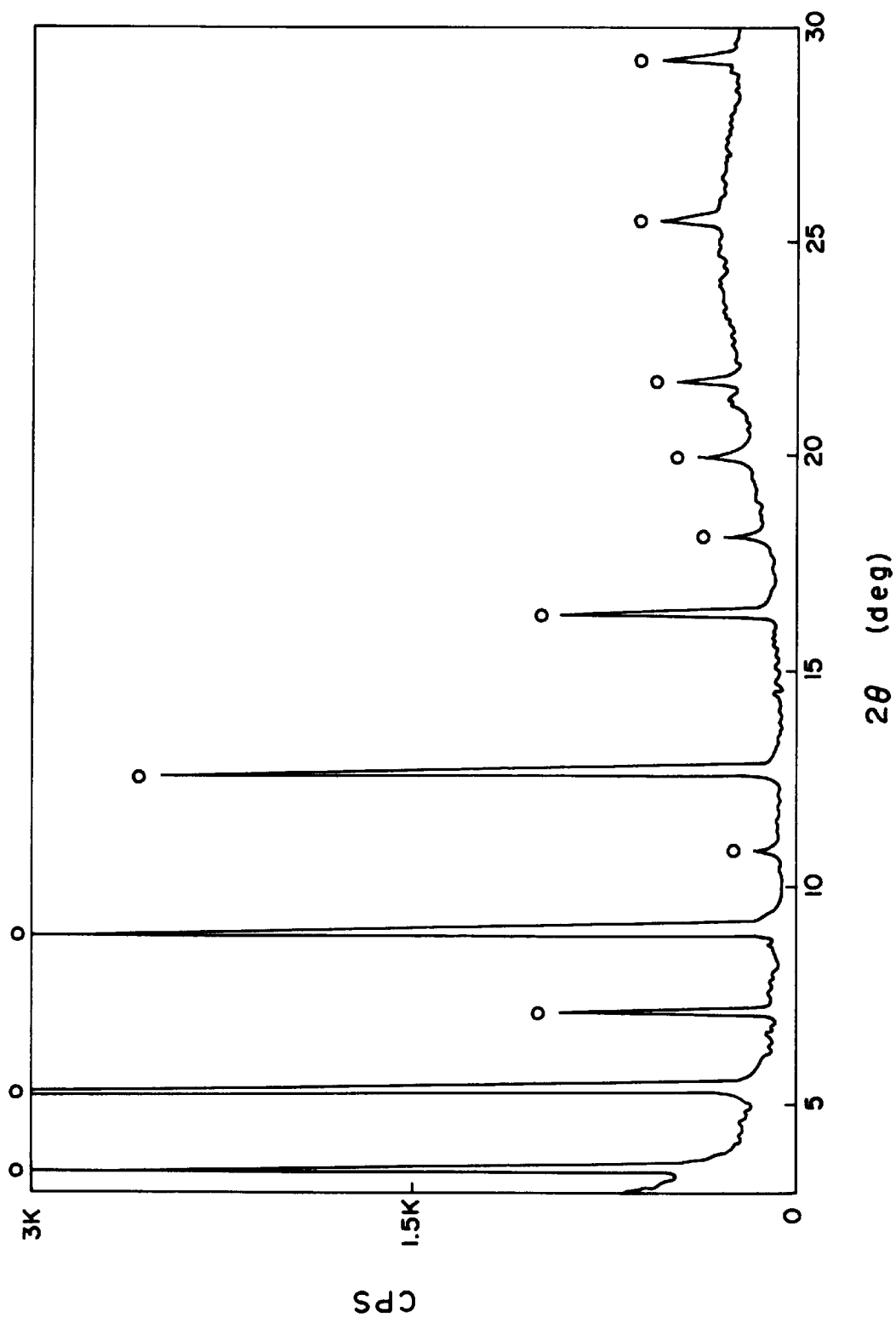

×500

×500

OPTICALLY ANISOTROPIC RECORDING MEDIUM AND METHOD OF RECORDING AND ERASING INFORMATION USING THE SAME

CROSS REFERENCE TO RELATED APPLICATIONS

This application is a continuation of application Ser. No. 08/686,456, filed Jul. 25, 1996, now abandoned, which is a continuation of application Ser. No. 08/340,187, filed Nov. 14, 1994, now abandoned, which is a continuation of application Ser. No. 08/056,604, filed May 3, 1993, now abandoned, which is a continuation of application Ser. No. 07/362,027, filed Jun. 6, 1989, now abandoned.

BACKGROUND OF THE INVENTION

1. Field of the Invention

This invention relates to a heat mode recording and erasing method which is effected by applying thermal energy or light to a recording medium, and more particularly to a recording and erasing method which utilizes the reversible changes in the crystalline state of a recording layer comprising the optical anisotropic thin-film-shaped crystals of an organic material as caused by the application of thermal energy thereto. The present invention also relates to a recording medium employed in the above information recording and erasing method.

2. Discussion of Background

Recently, a recording system, referred to as a "heat mode recording system", has been developed. In this system, information is recorded in a recording material by applying light thereto which is converted to thermal energy so as to change the shape or physical properties of the recording material.

As the recording media for the heat mode recording system, inorganic recording media comprising as the main component a metal such as Te, Bi, Se, Tb or In, and organic recording media comprising any of organic dyes such as polymethine dyes, for example, cyanine; macrocyclic aza-azulene dyes, for instance, phthalocyanine, naphthalocyanine and polyfirryne; naphthoquinone dyes; anthraquinone dyes; and diol metal complex dyes, have been widely known as the heat mode recording media.

When thermal energy is applied to any of the above recording media by application of a laser beam, a recording layer of the recording medium is fused or vaporized, resulting in the formation of pits for information recording. However, the thus recorded information in the recording medium is not erasable, and new information cannot be overwritten on the recorded information. In other words, the heat-mode optical recording medium can be used only for recording information and reproducing the recorded information.

Attention is currently focused on a reversible recording medium in which not only recording and reproduction of information, but also erasing of recorded information can be achieved.

Magneto-optical recording media which comprise a thin alloy layer consisting of an alloy of rare earth elements such as Gd, Tb and Dy, and transition metals such as Fe, Ni and Co have been known as reversible recording media.

In this type of recording media, both thermal energy generated by application of a laser beam, and a magnetic field applied thereto are employed in combination for recording information. The recorded information is reproduced by using the difference in the rotation angle of the light reflected by the recording medium between a recorded area and a non-recorded area, which corresponds to the direction of the magnetization of the recording medium. The recorded information can be erased by applying an external magnetic field which is in the reverse direction to the magnetic field applied for recording information.

The magneto-optical recording medium, however, has a low reproduction sensitivity and an insufficient S/N ratio because of the small difference in the rotation angle of the light reflected thereby between a recorded area and a non-recorded area. Furthermore, the recording sensitivity of the recording medium is deteriorated with time, and recorded information cannot be stably stored in the recording medium for a long period of time due to the oxidization of the recording layer.

In addition to the above, a reversible recording medium which comprises a recording layer made of a thin layer of an inorganic material comprising as the main component an inorganic material such as Ge, Te, Se, Sb, In or Sn has also been known. In this recording medium, the phase transition between a crystalline state and an amorphous state in the recording layer is utilized for recording, reproducing and erasing of information. In this type of recording medium, recording information and erasing recorded information can be performed by mere application of a laser beam thereto in a heat mode. The recorded information is reproduced by detecting the difference in reflectance between a recorded area and a non-recorded area in the recording medium. However, the difference in reflectance between the recorded area and non-recorded area of the recording medium is so small that there are still problems with the reproduction speed and the reliability.

Japanese Laid-Open Patent Applications 54-119377, 55-154198, 63-39378 and 63-41186 disclose resin matrix materials and thermal recording materials comprising any of the resin matrix materials and finely-divided particles of a low-molecular weight organic material dispersed in the matrix material. Any of these thermal recording materials becomes opaque (in a light shielding state) when it is heated to a certain temperature or above and then cooled. When the recording material is heated to another certain temperature, and then cooled, it becomes transparent. The above phenomenon is reversible, so that both recording and erasing of information can be achieved. The contrast obtained by the above-mentioned light-shielding property is sufficient for visual reading. However, the contrast is insufficient for the observation of a portion with a size of several micrometers in a recorded area which is to be microscopically enlarged. This is because the finely-divided particles of a low-molecular weight organic material are dispersed in the resin matrix in the recording layer, so that light scattering in the recording layer changes, depending upon the state of the lower-molecular weight organic material. However, when the recorded area is in the size of several micrometers, the size of the finely-divided particles is too small to cause the particles to scatter light. In order to avoid this problem, it may be considered that the recording layer is made much thicker than the thickness required for recording. However, in practice, it is extremely difficult to heat the thick recording layer uniformly in the direction of its thickness to form a small recorded area. Thus, the above-mentioned recording media are not suitable for high density recording.

Other erasable recording media and recording methods which use organic materials are proposed. For instance, mixtures of an organic metal complex bis(1-p-n-alkylphenylbutane-1,3-dionato)(II) and organic polymeric materials are disclosed in Japanese Laid-Open Patent Application 58-199343; mixtures of crystalline thermoplastic resins and amorphous thermoplastic resins in Japanese Laid-Open Patent Application 63-15793; crystalline aromatic vinylene sulfide polymers in Japanese Laid-Open Patent Applications 63-95993 and 63-96748; diazabicyclo[2,2,2]-octane quaternary salts, and stretched polymers, and recording methods of using the crystallization of liquid crystalline polymers, amorphous transition and changes in orientation of polymers in Japanese Laid-Open Patent Application 63-259851. These recording media and recording methods cannot be employed in practice because the recording and erasing speeds are slow.

SUMMARY OF THE INVENTION

It is therefore an object of the present invention to provide a recording medium capable of recording information with high density, retaining recorded information in a stable manner for a long period of time, reproducing the recorded information and erasing the same reversibly at high speed.

Another object of the present invention is to provide a method of recording information, reproducing and erasing the same at high speed by using the above recording medium.

The first object of the present invention can be achieved by a recording medium comprising a substrate and a recording layer formed thereon which comprises as the main component thin-film-shaped, optically anisotropic crystals of an organic material such as a fatty acid, a fatty acid derivative, a benzoic acid derivative, or a n-alkane or derivative thereof having a melting point of 50° C. or more.

The second object of the present invention can be achieved by the steps of (1) melting the thin-film-shaped crystals in the recording layer of the recording medium by heating to a recording temperature for recording information in the recording medium, and (2) thereafter rapidly cooling the the recording layer to partially change the crystalline state of the recording layer thin-film-shaped crystals, thereby recording information in the recording layer, and (3) when erasing the recorded information, applying heat or light to the recording layer so as to raise its temperature to an erasing temperature which is lower than the recording temperature, at which the thin-film-shaped crystals are not melted, but the molecules thereof can be sufficiently moved by the thermal energy, thereby erasing the recorded information.

The present invention is based on the discovery that when optically anisotropic, organic thin-film-shaped crystals are instantly heated, the crystalline state thereof is partially changed, and when the crystals are heated again to an appropriate temperature so as to return the crystalline state to the original crystalline state, the polarizing characteristics of the organic crystals are greatly changed in accordance with the successive heat application.

The recording medium, and the recording and erasing method according to the present invention are based on the above reversible changes in the crystalline state of an organic material.

This recording medium may comprise (1) a light-to-heat conversion layer which is capable of absorbing all or part of the applied heat at the time of recording and converting the absorbed light to heat and (2) a recording layer comprising thin-film-shaped crystals of an optically anisotropic material. Alternatively, instead of forming the light-to-heat conversion layer, a light-to-heat conversion material having the same function as that of the light-to-heat conversion layer may be contained in the recording layer.

In the recording and erasing method according to the present invention, the changes in the molecular orientation of the organic material and the partial micro-crystallization of the organic material, caused by the changes in the crystalline state thereof, may be utilized for recording information and erasing recorded information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 is an X-ray diffraction chart of the recording medium in FIG. 12 after recording information.

FIG. 14 is an X-ray diffraction chart of the recording medium in FIG. 12 after erasing recorded information.

DETAILED DESCRIPTION OF THE PREFERRED EMBODIMENTS

Figure 1:
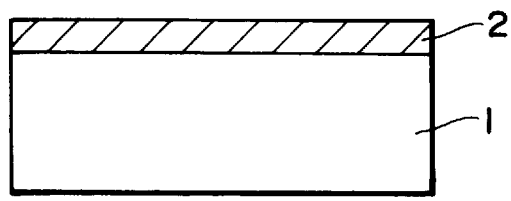
FIGS. 1 to 5 are schematic cross-sectional views of examples of a recording medium according to the present invention, in which reference numeral 1 designates a substrate, reference numeral 2 designates a recording layer made of organic thin-film-shaped crystals having optical anisotropy, reference numeral 3 designates a light-to-heat conversion layer, reference numeral 4 designates an undercoat layer and reference numeral 5 designates a protective layer.

The recording medium for use in the method of recording information and erasing recorded information according to the present invention comprises a substrate, and a recording layer formed on the substrate, comprising optically anisotropic organic thin-film-shaped crystals. Representative examples of such crystalline materials for the recording layer include fatty acids, derivatives of fatty acids, derivatives of benzoic acid, n-alkanes having a melting point of 50° C. or more, and derivatives thereof.

Specific examples of the above fatty acids and derivatives thereof are saturated monocarboxylic acids, saturated dicarboxylic acids, unsaturated monocarboxylic acids, unsaturated dicarboxylic acids; esters, amides, anilides, hydrazides, ureides and anhydrides of the above carboxylic acids; and salts such as metal salts of the carboxylic acids.

Examples of the above-mentioned esters of the carboxylic acids include esters between the carboxylic acids and compounds having two or more of hydroxyl groups, such as mono-, di- and triglycerides. These esters may have a substituent such as a halogen, a hydroxyl group, an acyl group, an acyloxyl group, or an unsubstituted aryl group.

These saturated or unsaturated carboxylic acids may be linear or branched ones. The unsaturated carboxylic acids may have one or more of double or triple bonds. It is preferable that the saturated or unsaturated carboxylic acids have 10 or more of carbon atoms.

Specific examples of the saturated fatty acids are undecanoic acid, lauric acid, myristic acid, pentadecanoic acid, palmitic acid, heptadecanoic acid, stearic acid, nanodecanoic acid, arachidic acid, behenic acid, lignoceric acid, cerotic acid, montanic acid, and melissic acid.

Specific examples of the unsaturated fatty acids are oleic acid, elaidic acid, linoleic acid, sorbic acid, and stearic acid.

Specific examples of the esters of the fatty acids are methyl esters, ethyl esters, hexyl esters, octyl esters, decyl esters, dodecyl esters, tetradecyl esters, stearyl esters, eicosyl esters, and docosyl esters of the above-enumerated fatty acids.

Specific examples of metal salts of the fatty acids are sodium, potassium, magnesium, calcium, nickel, cobalt, zinc, cadmium, and aluminum salts of the above fatty acids.

Specific examples of the derivatives of benzoic acids include the benzoic acids having the following formulae (I) to (IV) and esters, amides and anilides thereof.

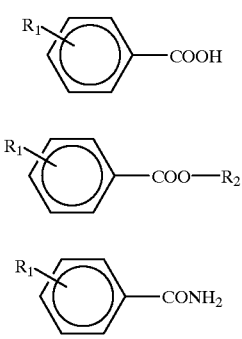

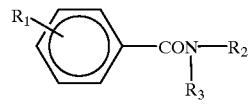

Furthermore, substituted or unsubstituted hydrazides, ureides, and anhydrides, and salts such as metal salts and ammonium salts of the above benzoic acids are also included.

Examples of the esters of the benzoic acids include not only the compound represented by formula (II) but also esters between benzoic acid or derivatives thereof and polyhydric alcohols of aliphatic hydrocarbons or aromatic hydrocarbons having a plurality of hydroxyl groups.

Examples of substituents of $R_1$, $R_2$ and $R_3$ in the above formulae (I) to (IV), and those of other benzoic acid derivatives are, for instance, hydrogen, an alkyl group, an alkoxyl group, a phenyl group, and an aryl group such as a biphenyl group, a naphthyl group, and an anthranyl group.

Besides the above, $R_1$ may be an acyl group, an acyloxyl group, halogen, a nitro group, a hydroxyl group, a cyano group, a carboxyl group and an ester thereof, a substituted or unsubstituted carbamoyl group, a sulfoxyl group and an ester thereof, or an amino group which may be substituted with an alkyl group, a phenyl group or a substituted phenyl group.

The above-mentioned alkyl group, alkoxyl group and aryl group may have the same substituent as any of the above-enumerated substituents of $R_1$.

The alkyl group and the alkoxyl group may be linear or branched, and those having two or more of carbon atoms may contain unsaturated bond(s) in the carbon chain.

The derivatives of n-alkane are the following compounds: compounds containing one or more of double or triple bond in the carbon chain, compounds in which one or more halogens are substituted for one or more hydrogens, and compounds in which the terminal carbon atom is bonded to a benzene ring which may have a substituent such as an alkyl group or an alkoxyl group.

Specific examples of the n-alkane are tetracosane, pentacosane, hexacosane, heptacosane, octacosane, nonacosane, triacontane, dotriacontane, tetratriacontane, hexatriacontane, octatriacontane, and tetracontane; and mixtures containing as the main component any of the above n-alkanes, for example, paraffin and paraffin wax.

Specific examples of the derivatives of n-alkane are 1-hexacosene, 1-heptacosene, 1-octacosene, 1-triacontene, 1-tetracontene, 1-hexatriacontene, 1-octatriacontene, 1-tetracontene, dococyl benzene, tetracocyl benzene, hexacocyl benzene, octacocyl benzene, triacontyl benzene, tritriacontyl benzene, tetratiacontyl benzene, hexatriacontyl benzene, 1,18-dibromoctadecane, 1,20-dibromeicosane, and 1,22-dibromdocosane.

It is preferable that the material for the recording layer have a melting point of 50 to 200° C., preferably 60 to 150° C., when the recording speed and the preservability of the recorded information are taken into consideration.

The previously mentioned organic compounds are employed solely or in combination in the recording layer of the recording medium according to the present invention. The recording layer for use in the present invention comprises as the main component the thin-film-shaped crystals of the organic compound, and if necessary, any of the following resins can also be incorporated. Examples of such resins include polyvinyl chloride, a copolymer of vinylchloride and vinylacetate, a copolymer of vinylchloride, vinylacetate and vinylalcohol, a copolymer of vinylchloride, vinylacetate and maleic acid, a copolymer of vinylchloride and acrylate, polyvinylidene chloride, a copolymer of vinylidene chloride and acrylonitrile, polyester, polyamide, polyacrylate, polymethacrylate, polycarbonate, polyurethane, and silicone resin. The above resin may be incorporated in the recording layer three times (weight basis) or less the amount of the organic compound, and preferably the same amount or less of the organic compound.

A glass plate, a metal plate, and a plate of plastics such as polymethyl methacrylate and polycarbonate can be used as the substrate of the recording medium of the present invention. In the case where recorded information is read by transmitted light, the substrate is required to be made of such a material that can transmit the reproduction light. On the other hand, when recorded information is read by reflected light, the substrate is necessary to reflect a part of the reproduction light. For this purpose, the substrate is provided with a light-reflection layer made of a metal or a metalloid such as platinum, titanium, silicon, chromium, nickel, germanium, or aluminum.

In the information recording and erasing method according to the present invention, information is recorded by applying thermal energy, corresponding to information to be recorded, to the recording layer of the recording medium. Therefore, in the case where the thermal energy is applied by a laser beam, it is necessary to provide a light-absorption layer, which may be referred to as the light-to-heat conversion layer, between the substrate and the recording layer, which absorbs part of the applied light and converts it into heat; or to incorporate into the recording layer a light-absorption material which absorbs the applied light and converts it to heat.

The light-absorption layer can be prepared by a metal or a metalloid such as platinum, titanium, silicon, chromium, nickel, germanium or aluminum. Such a layer can serve both as a light-absorption layer and a light-reflection layer.

A layer which contains a light-absorptive dye such as an azo dye, a cyanine dye, a naphthoquinone dye, an anthraquinone dye, a squarylium dye, a phthalocyanine dye, a porphyrin dye, an indigo dye, a dithiol complex dye, an azulenium dye, a quinone imine dye, or a quinone diimine dye can also be employed as the light-absorption layer. The dye is suitably selected depending on the wavelength of light to be used for information recording.

The above-enumerated dyes can also be incorporated into the recording layer so that the recording layer itself can absorb the light applied for information recording.

The recording medium according to the present invention comprises a recording layer which is made of optically anisotropic organic thin-film-shaped crystals or contains the same. There is, however, no limitation to the structure of the recording medium. The most common structures of the recording medium are illustrated in FIGS. 1 to 5.

FIG. 1 is a schematic cross-sectional view of a recording medium in which an organic thin-film-shaped crystal layer having optical anisotropy or recording layer 2 containing the crystal is formed on a substrate 1.

Figure 2:
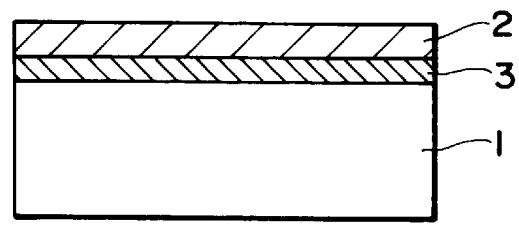

FIG. 2 is a schematic cross-sectional view of a recording medium in which a light-absorption layer 3 capable of absorbing part of applied light and converting it into heat is formed on a substrate 1, on which is provided an organic thin film crystal layer having optical anisotropy or recording layer 2 containing the same.

Figure 3:
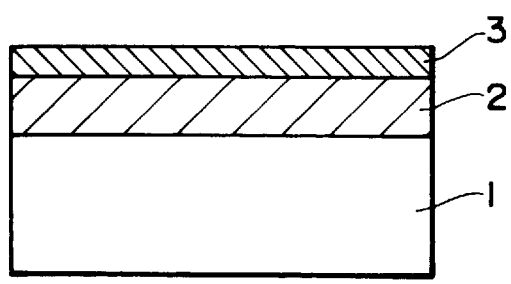

FIG. 3 is a schematic cross-sectional view of a recording medium in which a light-absorption layer 3 is provided on a recording layer 2 which is formed on a substrate 1.

Figure 4:
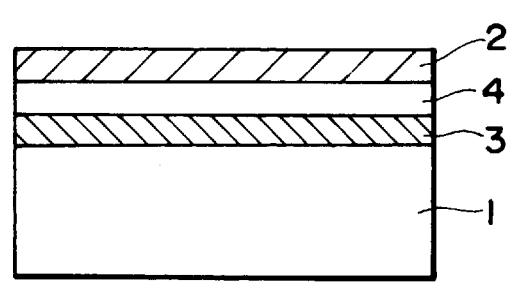

FIG. 4 is a schematic cross-sectional view of a recording medium which is a modified type of the recording medium shown in FIG. 2. Namely, in this recording medium, an undercoat layer 4 is provided between a recording layer 2 and a light-absorption layer 3 so as to improve the layer-quality of the recording layer 2.

Figure 5:
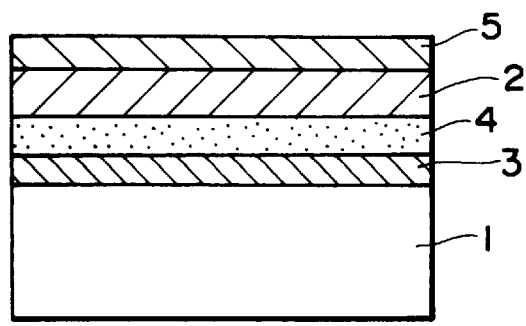

FIG. 5 is a schematic cross-sectional view of a recording medium which is a modified type of the recording medium shown in FIG. 4. In this recording medium, a protective layer 5 is further provided on the recording layer 2 of the recording medium shown in FIG. 4.

In the undercoat layer 4, various resins which are usable in the recording layer 2 and mentioned previously can be employed.

The protective layer 5 can also be prepared by employing the above resins, and, besides, a glass plate is usable. In the case where a glass plate is used as the protective layer, a layer made of the above resin can be provided on the surface which faces the recording layer, and, if necessary, the surfaces of the glass plate can be treated with a silane or titanate surface treatment agent so as to improve the properties of glass.

The recording medium of the present invention is prepared in the following manner. On a substrate 1, a light-absorption layer 3 made of the previously mentioned metal or metalloid is formed by means of vacuum deposition, sputtering or plating, and a recording layer 2 is provided on the light-absorption layer 3.

The recording layer 2 may be formed on the light-absorption layer 3 in one of the following manners.

(a) A protective layer 5 made of a glass plate or a resin film is capped on a substrate which has been provided with a light-absorption layer 3 with leaving a space corresponding to the thickness of a recording layer. In order to maintain the space, a spacer layer can be provided around the portion for the recording layer, or fine particles having a uniform diameter such as silica particles and polystyrene beads can be stuck on the surface of the light-absorption layer 3 or protective layer 5 in advance.

The protective layer-capped substrate is placed in a thermostatic chamber, or placed on a hot plate at a temperature higher than the melting point of a material for the recording layer. The material for the recording layer, which is in a fused state, is placed on the rim of the light-absorption layer 3, and allowed to permeate into the space formed between the light-absorption layer 3 and the protective layer 5. The permeated material is gradually cooled for crystallization, thereby obtaining the desired recording layer in a thin film crystal.

In order to maintain the space unchanged, the protective layer 5 and the substrate 1 provided with the light-absorption layer 3 may be pressed by using a weight while crystallization of the material for the recording layer is proceeding. Further, the crystallization may be conducted under reduced pressure so that the recording layer free from blowholes can be obtained.

(b) A material for recording layer is dissolved in a suitable organic solvent such as tetrahydrofuran, methyl ethyl ketone, methyl isobutyl ketone, chloroform, or carbon tetrachloride. The resulting solution is applied to the light-absorption layer 3 by means of spin coating, blade coating or dip coating, and then dried, or it is vacuum-deposited on the light-absorption layer 3. On the thus obtained layer, a resin dissolved in a proper solvent may be applied, if necessary, to form a protective layer.

Thereafter, the resultant is placed in a thermostatic chamber or placed on a hot plate, heated to temperatures higher than the melting point of the material for recording layer, and gradually cooled for crystallization, thereby obtaining the desired recording layer in a thin film crystal.

(c) In addition to the above manners (a) and (b), any known manners such as the Langmuir-Blodgett's technique can be applied for formation of the recording layer.

In order to incorporate a light-absorption material into the recording layer, the previously mentioned dye can be dissolved or dispersed in a solvent together with the material for the recording layer.

There is no particular limitation to the thickness of the recording layer, and the recording layer having a thickness of 10 Å to 10 μm, preferably 10 Å to 5 μm, is conveniently used.

The thickness of the light-absorption layer 3, which absorbs a part of applied light and converts it into heat, varies depending on the wavelength and intensity of the light used for information recording and the material used. However, in most cases, it falls within the range between 50 Å and 5 μm.

The information recording and erasing method according to the present invention utilizes the partial and reversible change in the states of the organic thin film crystal having optical anisotropy. Recording and erasing of information are performed by application of heat to the recording layer. The heat-application can be achieved by various manners. However, in order to attain information recording with high density, irradiation of condensed laser light is the most preferable manner. In this case, it is necessary to provide a light-absorption layer, which absorbs light and converts it into heat, to the recording medium, or to incorporate a light-absorption material capable of absorbing light and converting it into heat to the recording layer of the recording medium.

In the present invention, information is recorded as follows:

When a laser beam is applied to the recording layer, the light-to-heat conversion layer or a light absorbing material contained in the recording layer absorbs the light of the laser beam and converts the light to heat. By the thus generated heat, the recording layer comprising the thin-film-shaped crystals of the optically anisotropic organic material is instantly heated, and upon the termination of the laser beam, the laser-beam-applied portions are rapidly cooled, so that recording pits are formed. The term "recording pits" means neither holes nor cavities, but portions where the crystalline state of the thin-film-shaped crystals in the recording layer has been changed by the application of the laser beam, followed by the rapid cooling.

Upon the application of the laser beam to the recording layer, the laser-beam-applied portion immediately reaches a temperature at which the organic crystals in the recording layer are completely fused by the heat generated by the application of the laser beam. Upon the termination of the application of the laser beam, the generated heat is dissipated, so that the laser-beam-applied portion is immediately cooled and solidified or crystallized. Thus the fused state of the organic crystals in the recording layer in the recorded area is entirely different from the cooled, crystallized state of the organic material in the non-recorded area.

The change of the crystalline state of the organic material includes (1) the changes in the size or shape of the crystals of the organic material, (2) the change of the crystallographic axis of the organic material or the change of the orientation direction of the molecules of the organic material, and (3) the changes in the structure of the crystals.

In the recording layer before recording information, the thin-film-shaped crystals, having substantially a uniform thickness, are regularly arranged in substantially one direction. When the changes in the size or shape of the crystals take place as in the above changes (1), the crystals in a recorded area are further finely divided and aggregate in the form of a lump of the finely-divided crystals. These changes can be confirmed by observing a recording layer peeled off the substrate by a scanning-type microscope.

The change of the crystallographic axis of the organic material or the change of the orientation direction of the molecules of the organic material in the above (2) is such change that the crystallization takes place with the crystallographic axis of the organic material oriented in a different direction from that in the initial state although the structure of the crystal is not substantially changed, or the orientation of the molecules of the organic material in a recorded area is different from that in a non-recorded area.

The changes in the structure of the crystals of the organic material as in (3) means that a recorded area is crystallized in a crystalline state different from that in a non-recorded area around the recorded area. In these changes is included the case where the arrangement of the organic molecules is so disordered that an amorphous state is produced, or an area where a regular arrangement of the molecules of the organic material is significantly limited, in a recorded area.

These changes in the crystalline state are caused by partial application of heat to the thin-film-shaped crystals for a very short period of time by the application of a recording light beam, followed by rapid cooling of the light applied portion. The cooling in this case mainly depends upon the light application period.

It is extremely difficult to measure the temperature of a condensed-laser-beam-applied area. The changes in the temperature of the recording layer were obtained by simulation with the intensity distribution of the laser beam, with the light absorption and thermal conductivity taken into consideration, and the thickness of each of the layers and the thermal characteristics thereof set as shown in Table 1.

TABLE 1

|  | Thickness | Density (g/cm³) | Specific Heat (J/g · K) | Thermal Conductivity (W/m · K) | Refractive Index | |
|---|---|---|---|---|---|---|
|  |  |  |  |  | Real Number | Imaginary Number |
| Substrate | 1.2 mm | 2.5 | 0.5 | 0.65 | 1.56 | |
| Light-to-Heat Conversion Layer | 0.1 μm | 6.92 | 0.448 | 93.9 | 3.0 | 3.0 |
| Recording Layer | 0.8 μm | 0.983 | 2.03 | 0.168 | 1.5 | |
| Protective Layer | 0.6 μm | 1.18 | 1.47 | 0.21 | 1.49 | |

Wavelength of laser light: 830 nm

The result is that the time required for the recording layer to be cooled from 80° C. to 60° C. is about 1.7 μsec when the laser beam application time is 100 μsec, and about 15 nsec when the laser beam application time is 0.25 μsec. Thus the difference in the cooling rate between the above two cases is extremely great. Therefore, the changes in the crystalline state in the recording layer by application of heat or a light beam for a very short time are greatly changed by the light application time and not constant. For instance, in the case of micro-crystallization, there is a tendency that the greater the cooling rate, the more the fine-divided crystallization takes place. The cooling rate is also related to the orientation of the molecules of the organic material. Generally there is a tendency that the greater the cooling rate, the greater the disturbance of the arrangement of the molecules, so that the area in which the molecules are orderly arranged is limited to produce a state with a low crystallization degree. Under such conditions, there are at least partially areas with a particular orientation state. Thus, the recording method according to the present invention can be characterized in that the orientation of the molecules of the organic material in the recorded area is different from the orientation of the molecules of the organic material in the non-recorded area around the recorded area in the recording layer. The changes in the orientation of the molecules of the organic material in the recording layer caused by the recording of information can be confirmed by an X-ray diffraction analysis. The previously mentioned changes (1), (2) and (3) in the crystalline state do not take place separately, but in combination. Further, in a portion to be fused by the application of a laser beam in the recording layer, the temperature and cooling rate of the portion are significantly different depending upon the distance between the light-to-heat conversion layer and the portion, and the distance between the center of the laser beam and the portion. In each spot in the recording layer, crystallization takes place under different conditions, so that the changes (1), (2) and (3) in the crystalline state take place in a different way from place to place within one recorded area.

Such changes in the crystalline state caused by recording information will now be explained more specifically by an example of an optically anisotropic recording medium comprising a substrate made of glass, a light-to-heat conversion layer made of a chromium-deposited layer formed on the substrate, a recording layer consisting of thin-film-shaped crystals of stearic acid formed on the light-to-heat conversion layer, and a protective layer made of vinyl chloride-vinyl acetate copolymer formed on the recording layer.

Before recording is performed, the thin-film-shaped crystal of stearic acid is a C-type crystal, with its a-axis and b-axis arranged substantially in parallel with the surface of the substrate.

Figure 6:
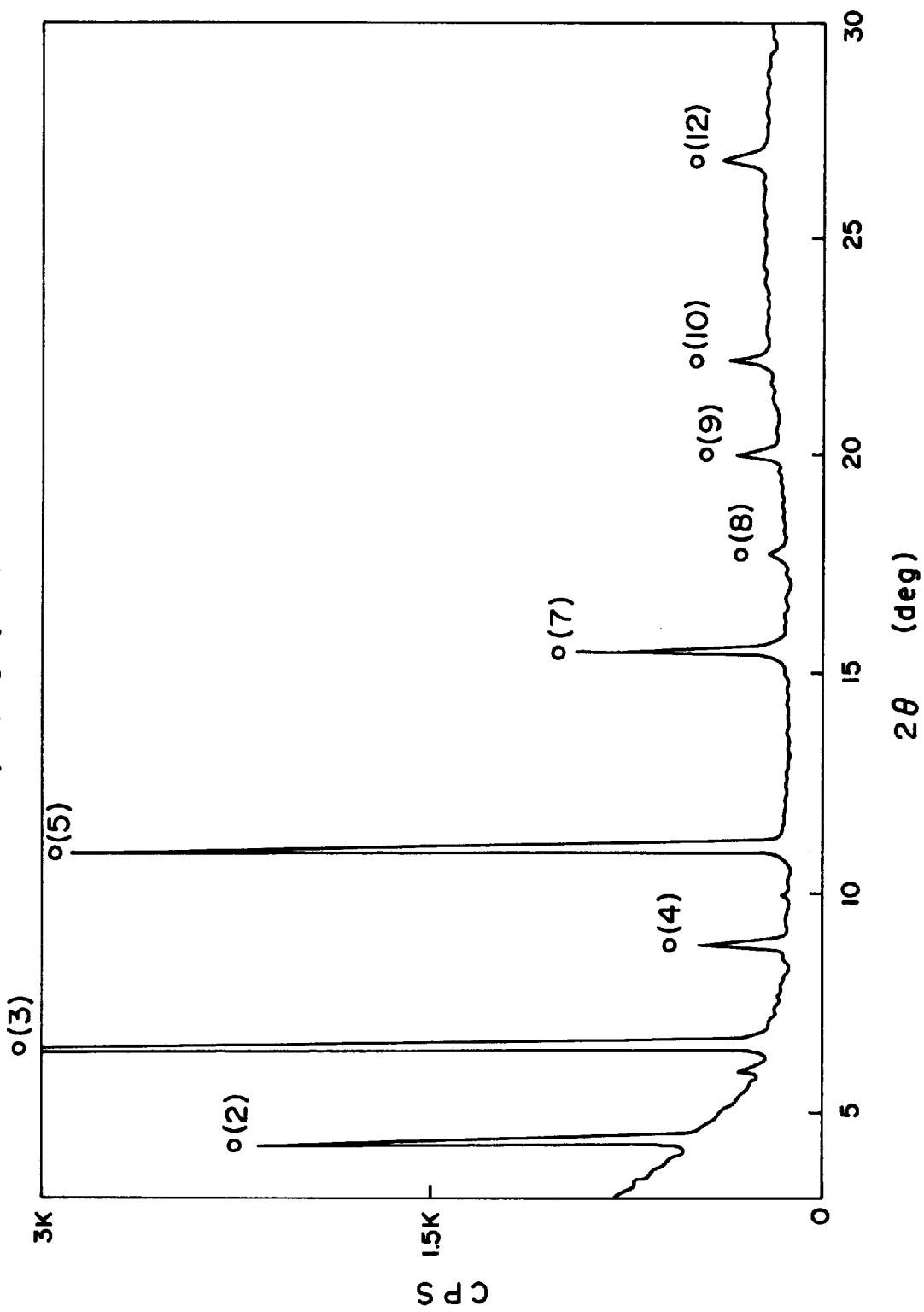
FIG. 6 is an X-ray diffraction chart of a recording medium according to the present invention, comprising a recording layer made of thin-film-shaped crystals of stearic acid, in which no information is recorded.

FIG. 6 shows an X-ray diffraction chart of the above recording layer, which indicates only the diffraction lines which are attributed to the long plane space (39.8 Å) thereof (n=2, 3, 4, 5, 7, 8, 9, 10 and 12).

Figure 7:
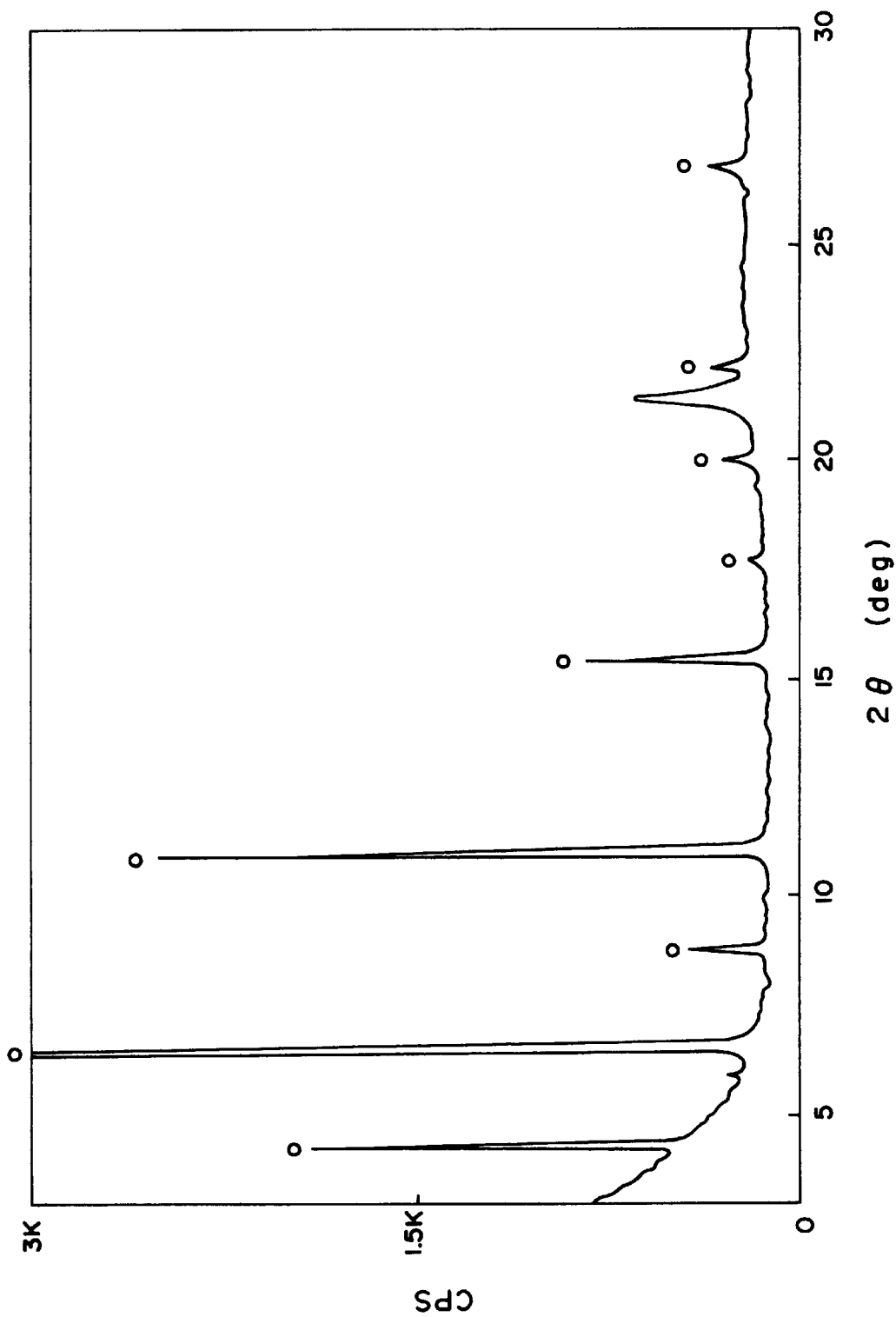
FIG. 7 is an X-ray diffraction chart of the recording medium identical to the above but after information recording.

FIG. 7 shows an X-ray diffraction chart of the above recording layer when the recording layer was continuously exposed to a semi-conductor laser beam with a beam diameter of 1 $\mu$m with a line speed of 3500 to 4000 mm/sec and a power intensity of 5 mW on the surface of the recording medium, thereby performing overall recording in a spiral manner without the space between recording lines. In this X-ray diffraction chart, in addition to the diffraction lines attributed to the C-type long plane space of stearic acid which appear before recording is performed, a new, clear diffraction line appears at 21.6°, which is due to the short plane space (4.11 Å) of the C-type crystal. This indicates that when recording is not performed, the crystals are such that the a-axis and b-axis thereof are oriented subtantially parallel to the surface of the substrate, but after the exposure to the laser beam, the structure of the crystals is changed in such a manner that the c-axis thereof is at least partially oriented parallel to the surface of the substrate.

These recorded states can be identified by optical observation means such as microscope and polarizing microscope. In particular, the changes in such crystalline state often take place together with the changes in polarizing characteristics thereof, so that in such a case, there are many cases where the changes in the crystalline state can be observed as the changes in monochromic contrast or in color tone under a crossed nicol condition by use of a polarizing microscope. Therefore, the reproduction (or reading) of the recorded information is performed by applying a polarizing light beam so as to be condensed on the recording medium and detecting the intensity of the light reflected by or transmitted through the recording medium by a polarizer which is positioned so as to transmit light having a vibration direction which is normal to the vibration direction of an incident light beam thereto. That is, the analyzing polarizer is oriented to pass rays which are polarized normal to the incident laser beam.

It is preferable that the intensity of light employed for reproducing recorded information be sufficiently smaller than that of light employed for recording information or erasing the same to such an extent that the temperature of the recording layer is not elevated to an erasing temperature by the reproduction light.

The recorded information, which is in the form of the changes in the crystalline state of the recording layer by partially applying heat to the optically anisotropic, thin-film-shaped crystals of an organic material in the recording layer so as to fuse the heat-applied crystals, followed by recrystallizing the same, can be erased when heated to such a temperature that is lower than the temperature for recording, at which the recording layer is not completely fused, but the molecules of the organic material can be thermally moved.

The temperature range in which recorded information can be erased will depend upon, for example, the materials employed in the recording layer and the purity of each material in which the recording is performed, but is lower than the melting point of the thin-film-shaped crystals that constitute the recording layer.

The erasing phenomenon which occurs in the recording layer can be observed by a polarizing microscope as the temperature of the recording layer is gradually elevated.

The recorded area, when observed by a polarizing microscope, appears to be dark lines in a bright non-recorded area. As the temperature is raised, the dark lines begin to wane and finally disappear to become as bright as the non-recorded area. When the recording layer is cooled from the temperature, the recorded information can be erased. When the recording layer reaches this erasing temperature, there is no change in the brightness of the non-recorded area. However, if the temperature is further elevated to reach the melting point of the recording layer, the recording layer looks dark as a whole when viewed by the polarizing microscope. Therefore, when the molecules of the organic material in a small recorded area, where the crystalline state thereof has been changed, become capable of sufficiently performing thermal movement, the molecules tend to be arranged in the same manner as the molecules in the non-recorded area, so that when the temperature is lowered to room temperature, the recording layer returns to a state where the thin-film-shaped crystals become uniform. Thus, the erasing of recorded information can be carried out.

More specifically, the entire erasing of recorded information can be carried out by heating the recording medium in its entirety to the above-mentioned temperature range and then cooling the recording medium. Furthermore, part of the recorded information can also be erased by heating locally part of the recorded pit area or a slightly larger area to the erasing temperature and then cooling the heated area. The latter erasing can be performed by the superimposing application of the laser beam employed for recording to the recorded area, with the intensity of the laser beam decreased so that the temperature of the recorded pit area is within the erasing temperature range. In this case, when the recorded pit area of the thin-film-shaped crystals in the recording layer, where the crystalline state is changed, is heated to the erasing temperature and then cooled, the changed crystalline state is returned to the original state which is the same as that of the non-recorded area, so that the recorded pits are erased. The thus erased state can be observed by optical means such as microscope and polarizing microscope as in the case of recorded state.

The recording method according to the present invention is attained by partially changing the crystalline state of the thin-film-shaped crystals which constitute the recording layer or which are contained in the recording layer, so as to partially change the orientation of the molecules in the recording layer or partially causing microcrystallization of the molecules, not mere change from a crystalline state to an amorphous state, without thermally forming holes in the recording layer, or changing the shape of the surface of the recording layer, and the erasing method according to the present invention can be attained by returning the changed crystalline state to its original crystalline state. The recorded area and the non-recorded area are identified by detecting the difference in the polarizing characteristics based on the optical anisotropy between the two areas. The recording medium according to the present invention is entirely different from the conventional recording media in this respect.

Specifically, the recording mechanism of the recording medium according to the present invention is entirely different from that of the previously described conventional recording medium in which an organic low-molecular weight compound is dispersed in a resin matrix and whose light-shielding property changes depending the temperature of the heat applied thereto. More specifically, an organic low molecular weight compound is dispersed in the form of finely-divided particles in the recording layer of this recording medium. The recorded area in this recording layer consists of a number of such finely-divided particles of the organic compound and the recording is performed by utilizing the difference in the light-shielding property based on light scattering between the recorded area and the non-recorded area.

The invention will now be explained more specifically by referring to the Examples. However, the following examples should not be construed as limiting the present invention.

EXAMPLE 1

An optically polished glass disk having a diameter of 101.6 mm and a thickness of 1.2 mm was vacuum-deposited with a chromium layer, which serves both as a light-reflection layer and a light-absorption layer, having a thickness of approximately 900 Å.

A 5 wt. % tetrahydrofuran solution of a vinylchloride-vinylacetate copolymer (Trademark "VYHH", made by Union Carbide Japan K.K.) was coated onto the chromium layer, and then dried, thereby obtaining a resin layer having a thickness of approximately 0.2 $\mu$m.

To this resin layer, a 10 wt. % tetrahydrofuran solution of stearic acid (made by Sigma Corp., 99% or more in purity) was applied, and dried at an elevated temperature of 45° C., followed by further application of the 5 wt. % tetrahydrofuran solution of the vinylchloride-vinylacetate copolymer and drying at 45° C.

The above-prepared disk was subjected to a thermal treatment at 90° C. for approximately 2 minutes, and then gradually cooled.

After a series of the above operations, a recording layer made of uniformly oriented thin-film-shaped crystals of stearic acid, having a thickness of approximately 0.8 $\mu$m, was formed on the chromium layer, and a protective layer made of the vinylchloride-vinylacetate copolymer having a thickness of approximately 0.6 $\mu$m was also formed on the recording layer, whereby a recording medium No. 1 according to the present invention was obtained.

In the thus obtained recording medium No. 1, information was recorded in the following manner. While rotating the recording medium at a speed of 900 rpm, a semiconductor laser beam having a wavelength of 830 nm, condensed to a diameter of 1 $\mu$m, was respectively applied under the following conditions (1) and (2). Information was recorded in a spiral form in the recording medium. The line speed in the recording direction was approximately 3,500 to 4,000 mm/sec in the recorded area.

Conditions for Application of Laser Beam (1)
  Lighting: Frequency 200 KHz, Duty Ratio 50%
  Intensity at the surface of recording medium: 5 mW
  Distance between recorded lines: approx. 3.5 $\mu$m (center distance)

Conditions for Application of Laser Beam (2)
  Lighting: Lighted Continuously
  Intensity at the surface of recording medium: 5 mW
  Distance between recorded lines: approx. 1 $\mu$m (center distance)

Figure 8:
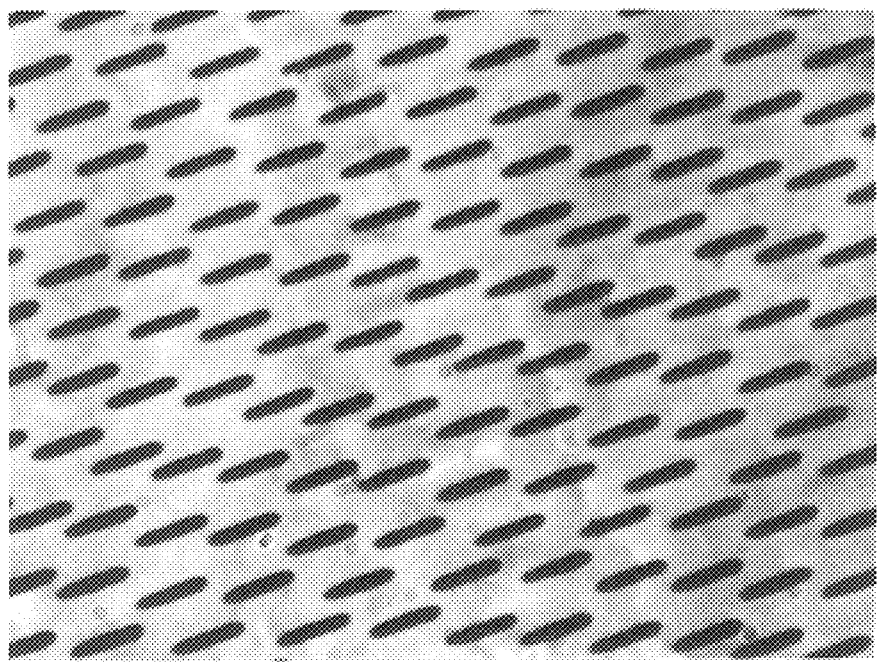
FIG. 8 is a polarizing microscopic photograph of a recorded area of the recording medium by application of a laser beam having a diameter of 1 $\mu$m.

When the recording medium in which information had been recorded under the above condition (1) was observed by a polarizing microscope under the condition of crossed nicol, a spiral line having a width of approximately 1 $\mu$m was clearly found at the recorded area as shown in the microphotograph in FIG. 8, which was hardly identified by an ordinary optical microscopic observation.

The recorded area of the recording layer was peeled off the chromium layer, and the surface thereof which had been in contact with the chromium layer was observed using an electronic scanning microscope. As a result, it was found that the laser-beam-applied portion was an aggregate of small plate-shaped crystals.

The recording medium in which information was recorded under the above conditions (2) was also observed using a polarizing microscope under the condition of crossed nicol. As a result, it was found that information was recorded on the entire surface of the laser-beam-applied area of the recording medium. X-ray diffractions of the recording medium before and after recording were measured in the identical portion.

The X-ray diffraction before information recording is shown in the chart of FIG. 6, and the one after information recording is shown in the chart of FIG. 7. As shown in the chart of FIG. 6, only the diffraction spectrum corresponding to the long plane space of a c-type crystal of stearic acid was observed. Thus, it was found that the crystals of stearic acid had such a structure with the a- and b-axes thereof oriented parallel with the surface of the substrate. On the other hand, the crystals of stearic acid after information recording showed the diffraction spectrum (2$\Theta$=21.6° C., see FIG. 7) corresponding to the short plane space. This means that the crystals had a structure with the c-axes thereof oriented in parallel with the substrate.

The recording medium in which information had been recorded under the conditions (1) was subjected to microscopic observation using a polarizing microscope while heating the recording medium from room temperature at a heating speed of 1° C./min. The recorded area of the recording medium was seen with a clear contrast until the temperature was elevated to approximately 60° C., and the temperature exceeded 60° C., the recorded part began to become vague. At about 68° C., the recorded part completely disappeared. The non-recorded area was unchanged until the temperature was elevated to 68° C. The recording medium was further heated, and at a temperature of 69.4° C., the view field was completely darkened. Thus, it was found that the thin-film-shaped crystals in the recorded layer were completely fused at this temperature.

A semiconductor laser beam having a wavelength of 780 nm, condensed to 5 µm in diameter, was applied to the recording medium in which information had been recorded under the conditions (1). In the above irradiation, the intensity of the light was continuously changed to 1.5 mW, 2 mW and 3 mW. The laser light was rectilinearly scanned at a line speed of 50 mm/sec, tracing the recorded area.

Figure 9:
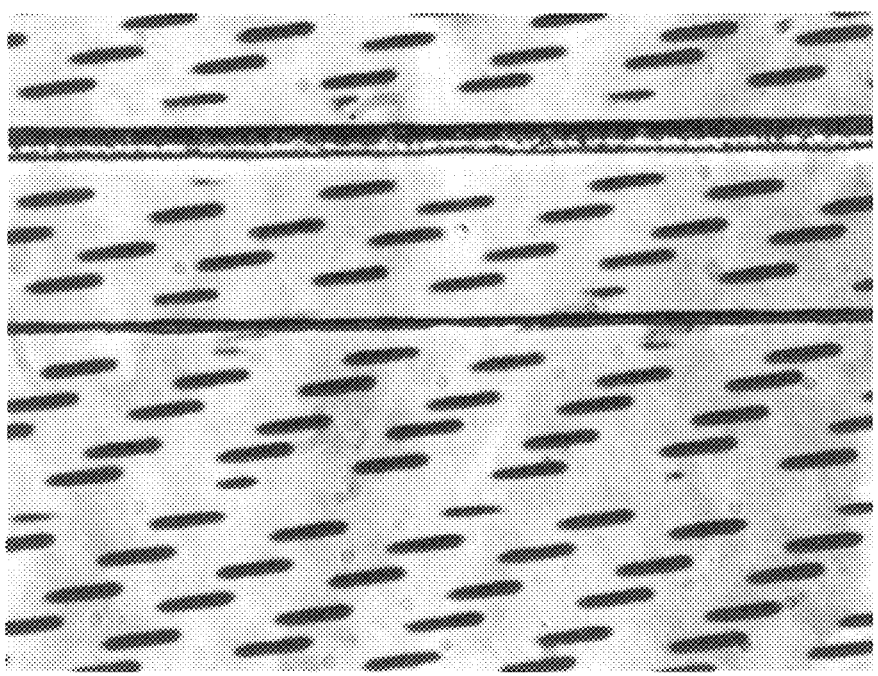
FIG. 9 is a polarizing microscopic photograph of a partially erased recorded area of the recording medium by superimposing application of a laser beam having a diameter of 5 $\mu$m.

The resulting recording medium was observed by a polarizing microscope. As shown in the microphotograph in FIG. 9, when the laser beams with an intensity of 2 mW and an intensity of 3 mW were applied to the recording layer, a new line-shaped recorded area was formed in a position corresponding to the central portion of the laser beam because the intensity of the applied laser beam was too great and the thin-film-shaped crystals were heated to the fusing temperature thereof. However, in the marginal portions of the new line-shaped recorded areas, that is, in the portions over which the peripheral portion of the laser beam scanned, the recorded area previously formed by a laser beam with a diameter of 1 µm was erased. On the other hand, in the area where a laser beam with an intensity of 1.5 mW was applied in a superimposing manner, the recorded area previously formed by a laser beam with a diameter of 1 µm was erased in the form of a band with a width of about 2.5 µm.

From the above results, it was confirmed that the recording layer was brought into an erasing temperature range when a laser beam with an intensity of 1.5 mW was applied and the recorded information was in fact erased.

EXAMPLE 2

A glass disk comprising a chromium layer serving as a light-absorption layer was prepared in the same manner as in Example 1. A small amount of silica fine particles having a diameter of approximately 1 µm was deposited as a gap material on one surface of a glass plate having a thickness of 0.1 mm, which serves as a protective layer. Both of the glass disk and the glass plate were placed in a thermostatic chamber at 100° C., and heated.

On the chromium layer, a small amount of behenic acid (made by Sigma Corp., 99% or more of purity) was placed and fused at the same temperature. Thereafter, the glass plate was covered on the fused behenic acid layer with the surface stuck with silica fine particles facing the behenic acid layer, spreading the behenic acid over the entire surfaces between the chromium layer and the glass plate. While weighting the resultant, the temperature of the thermostatic chamber was gradually lowered so as to crystallize the behenic acid, thereby obtaining thin film crystals of the behenic acid.

By a series of the above operations, a recording layer made of uniformly oriented thin film crystals of behenic acid, having a thickness of approximately 0.8 µm, was formed on the chromium layer, and a protective layer made of the glass plate having a thickness of 0.1 mm was formed on the recording layer, whereby a recording medium No. 2 according to the present invention was prepared.

Information was recorded in the above-prepared recording medium No. 2. Namely, while rotating the recording medium at 900 rpm, a semiconductor laser beam having a wavelength of 830 nm, condensed to 1 µm in diameter, was spirally applied at a line speed of 3,500 to 4,000 mm/sec. The conditions for irradiation were the same as in Example 1, that is, the aforementioned conditions (1) and (2), except that the intensity of the laser beam according to the conditions (1) was changed from 5 mW to 3 mW, 4 mW, 5 mW, 6 mW, 8 mW, 10 mW, and 12 mW, and the intensity of the laser beam according to the conditions (2) was changed from 5 mW to 8 mW.

The recorded area in which information was recorded under the conditions (1) was observed by a reflective polarizing microscope under the crossed nicol condition. As a result, recorded lines were clearly found in the recording layer to which the laser beam having an intensity of 4 mW or more was applied. As the light intensity became stronger, the width of the line became larger, for instance when the laser beam having an intensity of 4 mW was applied, the width of the line was approximately 0.4 µm, and when the light of 12 mW was applied, the width of the line was approximately 1.8 µm.

Figure 10A:
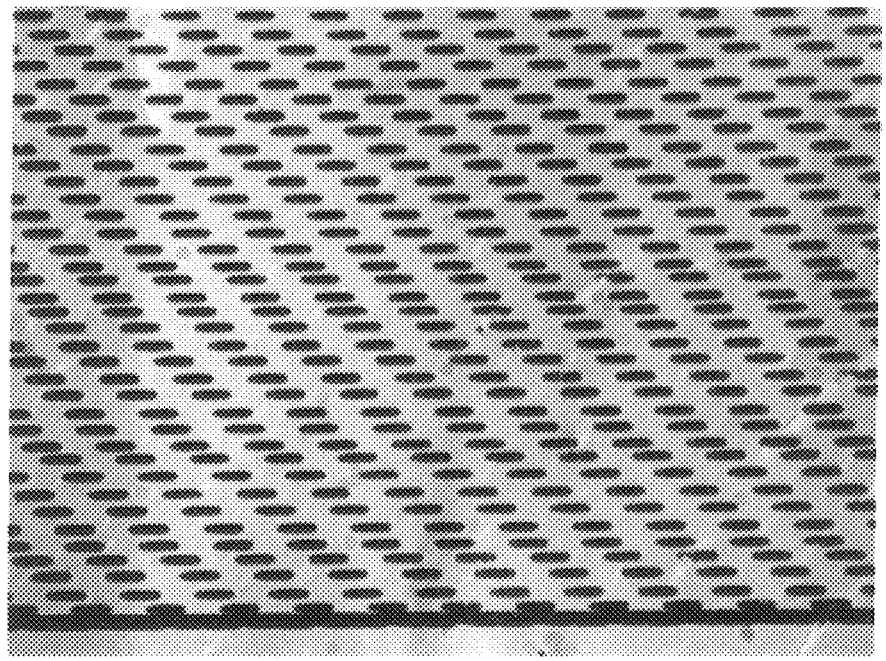
FIG. 10a is a polarizing microscopic photograph of a recorded area of a recording medium comprising a recording layer made of thin-film-shaped crystals of behenic acid by application of a laser beam having a diameter of 1 $\mu$m.
Figure 10B:
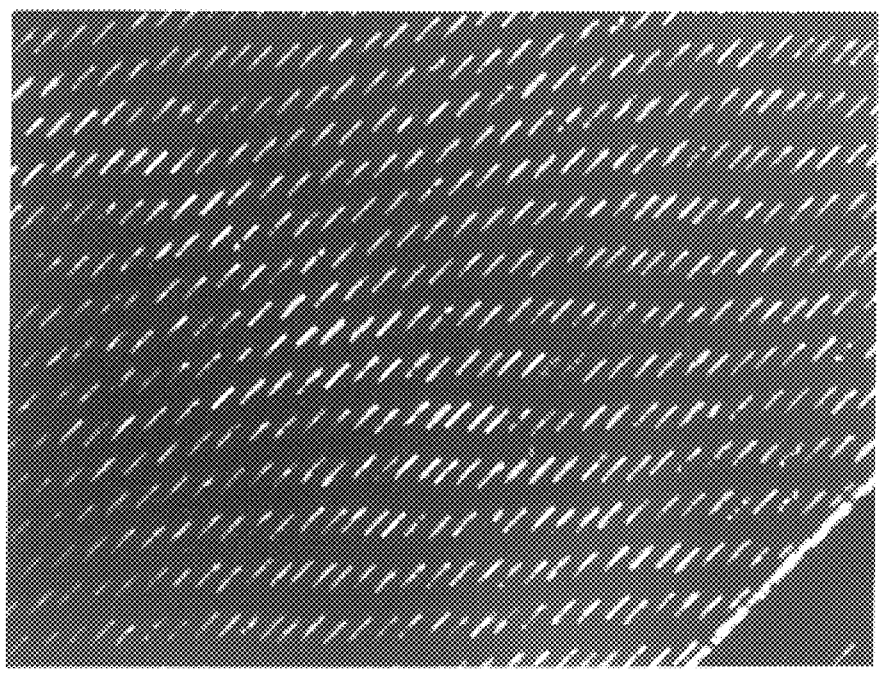
FIG. 10b is a polarizing microscopic photograph of the same recorded area as in FIG. 10a, provided that the recorded area is observed with a rotation of 45°.
Figure 11:
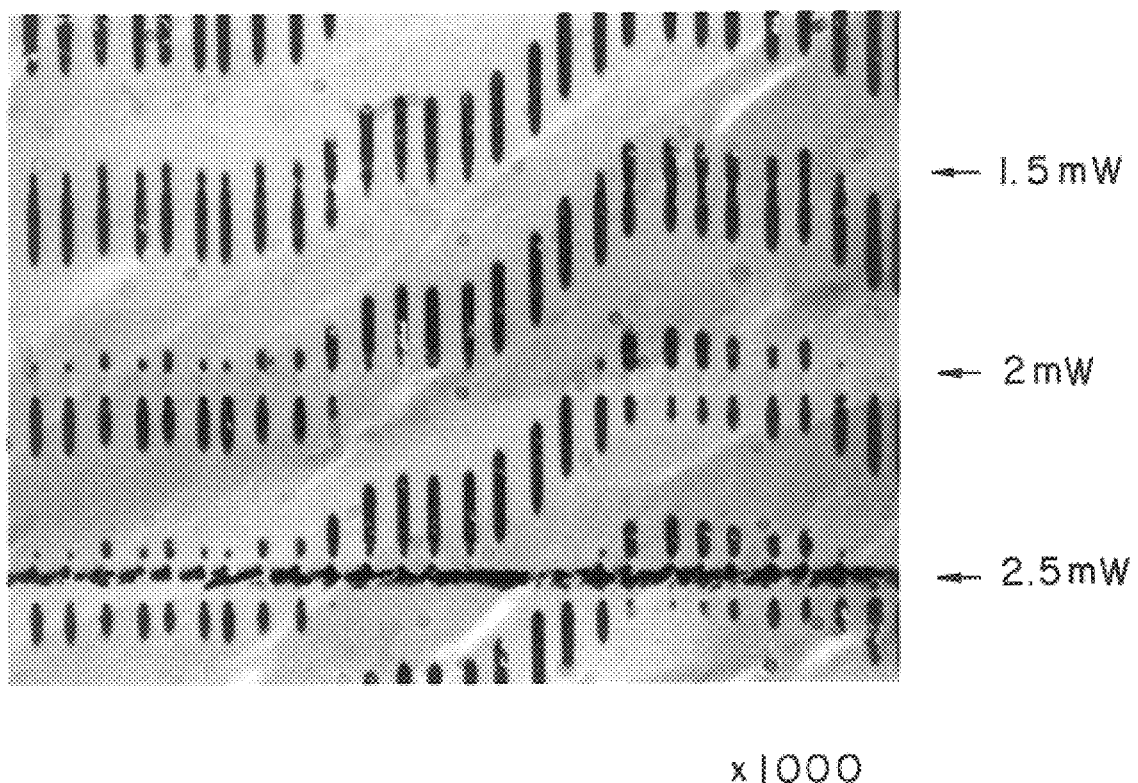
FIG. 11 is a polarizing microscopic photograph of a partially erased recorded area of the recording medium shown in FIG. 10a by superimposing application of a laser beam having a diameter of 5 $\mu$m.

When the recorded area placed on a specimen carrier was rotated, the contrast between the recorded area and the non-recorded area was reversed. Namely, at a certain angle, the non-recorded area looked bright and the recorded area looked dark. However, when the specimen carrier was turned with an angle of 45 degrees, the non-recorded area was seen dark and the recorded area was seen bright. FIGS. 10a and 10b are polarizing microphotographs of the recorded area in which information was recorded by applying a laser beam of 8 mW. These microphotographs are of the same portion of the recorded area but different in the angle of 45 degrees.

The recorded area was observed by a polarizing microscope as the recording medium was heated. In the beginning, the recorded area was clear, but it became vague when the temperature was elevated to 60° C., and completely disappeared at about approximately 77° C. The non-recorded area was unchanged at 77° C., and the entire crystal thin-film was fused at an elevated temperature of 79.5° C.

Figure 12:
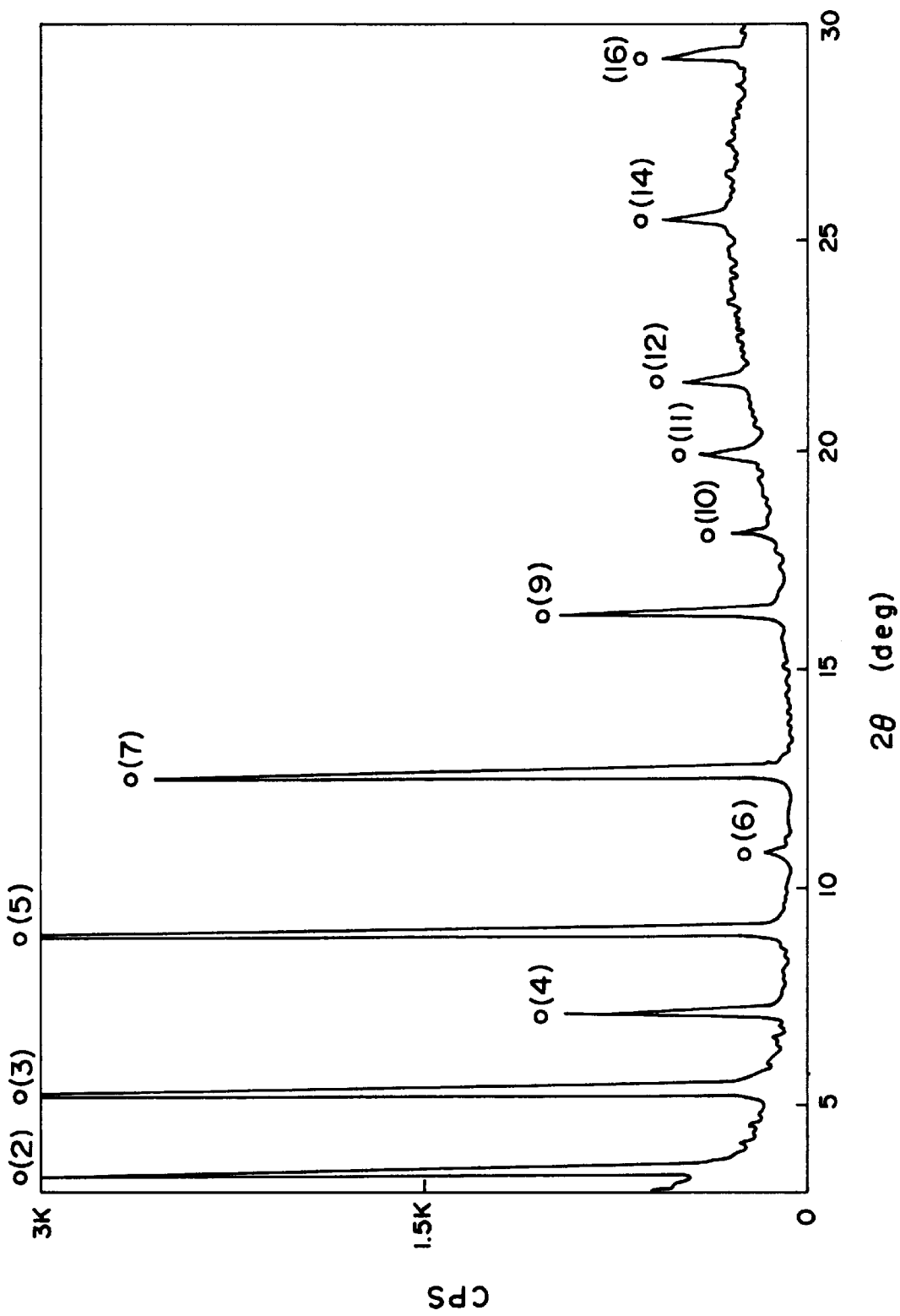
FIG. 12 is an X-ray diffraction chart of a recording medium comprising a recording layer made of behenic acid before recording information.

A laser beam was applied to a fresh recording medium No. 2 under the conditions (2), and the recording medium was then observed by using a polarizing microscope. As a result, it was found that information was recorded on the entire surface of the recording layer with high density. The protective layer made of the glass plate was removed from the recording medium, and the X-ray diffraction of the recording layer was measured. On the other hand, the protective layer was removed from the recording medium in which no information was recorded, and the X-ray diffraction of the recording layer was measured. The recording medium in which information had been recorded was heated to 75° C. at a rate of 1° C./min, and then cooled to room temperature. Thus, the recorded information was practically erased. The X-ray diffraction of such a recording medium was also measured. The X-ray diffraction charts are shown in FIGS. 12, 13 and 14. The chart in FIG. 12 is for the recording medium in which no information was recorded, the chart in FIG. 13 is for the recording medium in which information was recorded, and the chart in FIG. 14 is for the recording medium which the once recorded information was erased. These charts demonstrate that a part of the molecular orientation changes after information recording and recovers after erasing.

To the recording medium, in which information was recorded under the conditions (1) by applying a laser beam condensed to 1 µm in diameter, a laser beam with a diameter of 5 µm was applied with the intensity thereof continuously changed to 2.5 mW, 2 mW, and 1.5 mW. The recorded lines were scanned by the laser beam at a line speed of 50 mm/sec. Thereafter, the recording medium was observed by using a polarizing microscope. As a result, it was found that the recorded area to which the laser beam of 2 mW was applied was erased in the form of a band having a width of approximately 3 µm. When a laser beam of 2.5 mW was applied to the recorded area, a line-shaped line was newly formed because the intensity of the laser beam was too great, and the recorded area in the marginal portion of the new line was found to be erased. When a laser beam having an intensity of 1.5 mW was applied, the recorded area was made slightly smaller in size.

EXAMPLE 3

Recording medium No. 3 according to the present invention was prepared in the same manner as in Example 2 except that the thickness of the recording layer was changed from approximately 0.8 µm to approximately 0.6 µm.

Figure 15A:
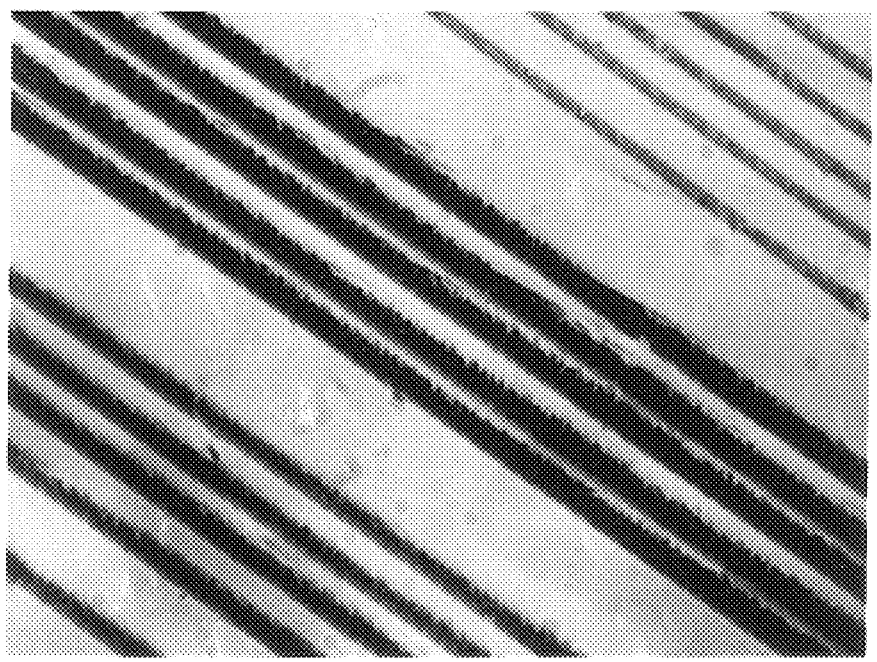
FIG. 15a is a polarizing microscopic photograph of a recorded area of a recording medium comprising a recording layer made of thin-film-shaped crystals of behenic acid by application of a laser beam having a diameter of 5 $\mu$m.
Figure 15B:
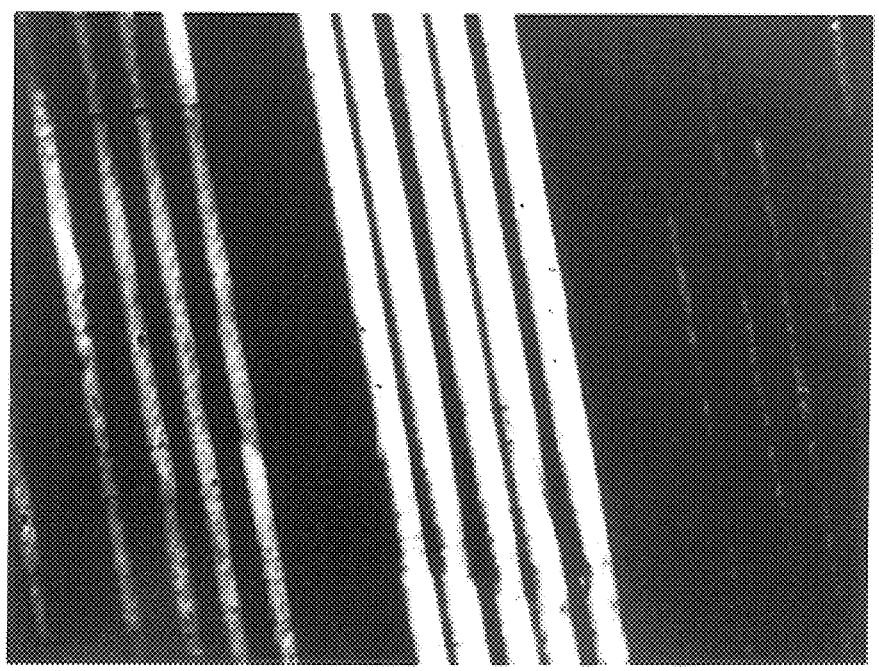
FIG. 15b is a polarizing microscopic photograph of the same recorded area as in FIG. 15a, provided that the recorded area is observed with a rotation of 45°.

A semiconductor laser beam having a wavelength of 780 nm, condensed to 5 µm in diameter, was applied to the above-prepared recording medium. The application was continuously conducted by changing the light intensity from 7 mW to 10 mw and 14 mW, and the recording medium was linearly scanned by the laser beam at a line speed of 200 mm/sec. The resulting recording medium was observed using a polarizing microscope, and recorded lines were clear as shown in the picture of FIG. 15a. When this portion was further observed by turning the specimen carrier with an angle of 45 degrees, the contrast between the non-recorded area and the recorded area was reversed.

A laser beam of 12 mW was applied to the entire surface of a fresh recording medium No. 3 under the same conditions as the above. The protective layer made of the glass plate was removed from the recording medium, and the X-ray diffraction of the recording layer was measured. For comparison, the protective layer of the recording medium No. 3 in which no information had been recorded was removed from the recording medium, and the X-ray diffraction of the recording layer was measured.

Figure 16:
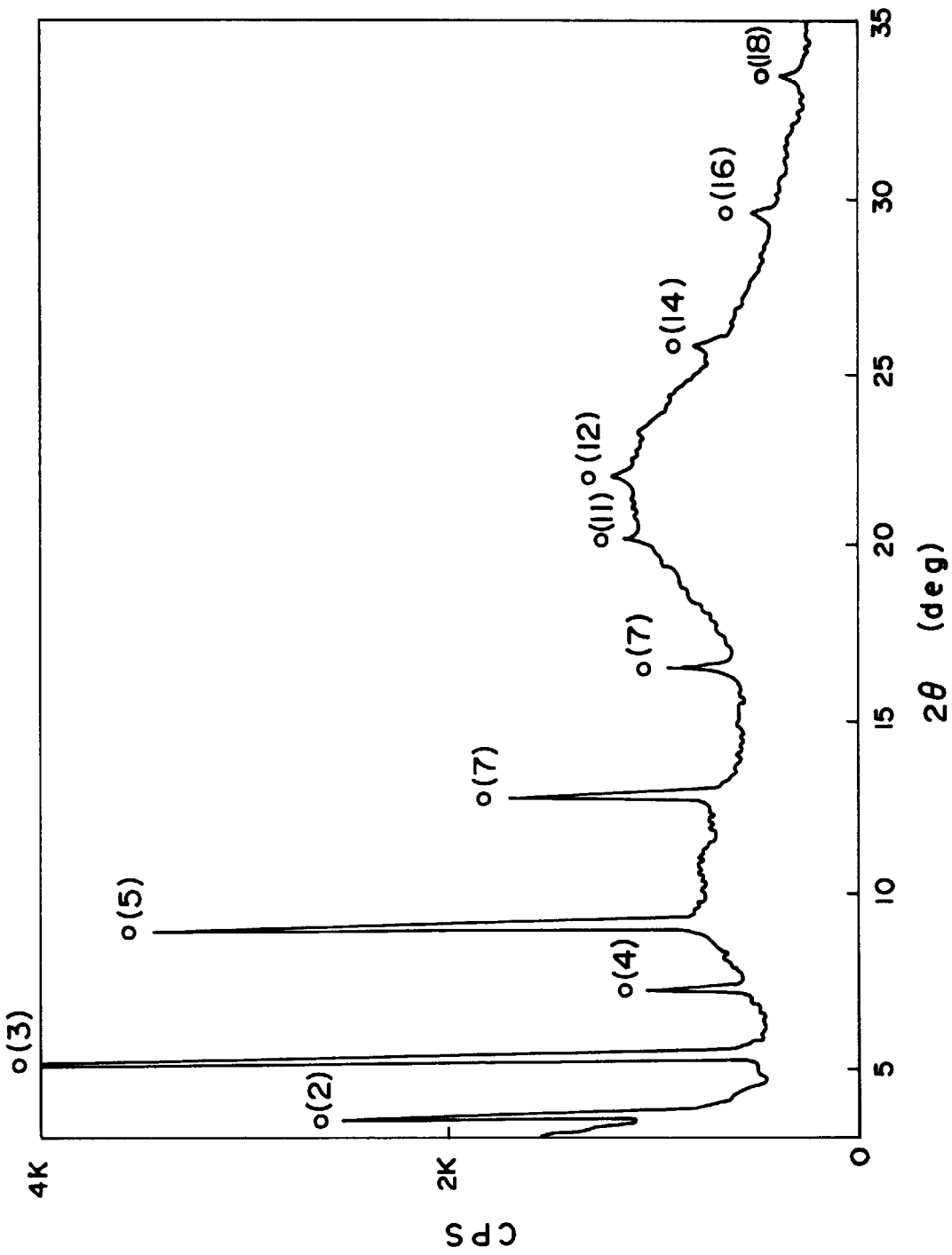
FIG. 16 is an X-ray diffraction chart of the same recording medium as in FIGS. 15a and 15b before recording information.
Figure 17:
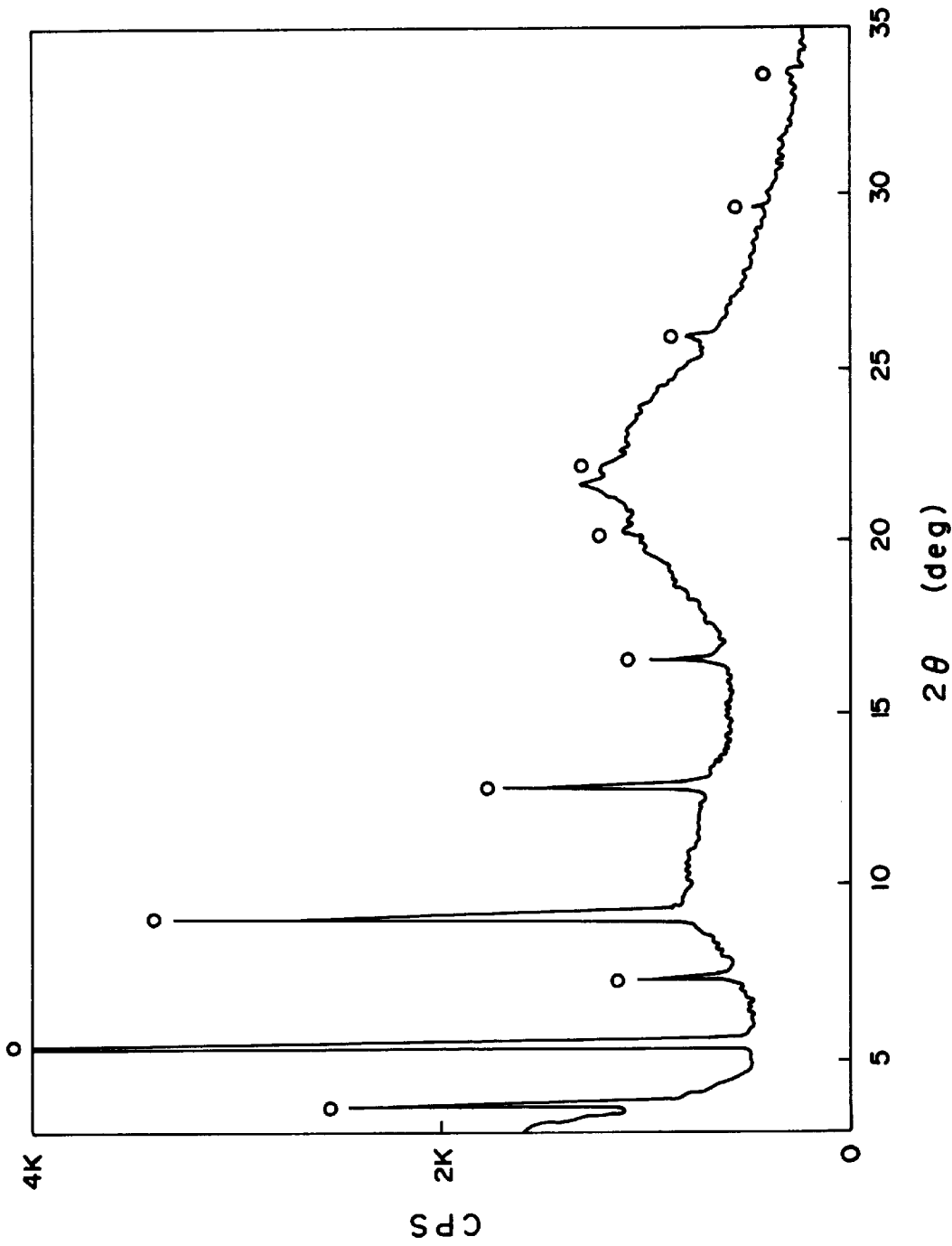
FIG. 17 is an X-ray diffraction chart of the recording medium in FIGS. 15a and 15b after recording information.

Both in the charts for the recording layer before information recording as in FIG. 16 and for the recording layer after information recording as in FIG. 17, the diffraction lines corresponding to the long plane space (48.3 Å) of the C-type crystal of behenic acid are clearly seen.

On the other hand, the changes in the portion of the short plane space as caused by the recording were different from those in Example 2 although the employed recording medium was similar to that employed in Example 2 in which the application time of the laser beam was shorter than in Example 3. However, the observation of this recording medium by use of a polarizing microscope indicated that the contrast between the recorded area and the non-recorded area was clear, so that it can be considered that the differences between the results obtained in this example and those in Example 2 were caused by the difference in the orientation mode of the crystals in the course of the recording step. In other words, the laser beam application time in Example 2 was about 0.25 µsec, while the laser beam application time in Example 3 was about 100 µsec. This difference was caused by the differences in laser beam diameter and line speed of laser beam between the laser beam in Example 2 and that in Example 3.

EXAMPLES 4–13

A glass disk having a chromium layer was prepared in the same manner as in Example 1. A polyimide resin solution (Trademark "JIB-1", made by Japan Synthetic Rubber Co., Ltd.) was applied to the chromium layer, and then dried at 150° C. for one hour, thereby providing a polyimide layer having a thickness of approximately 0.1 µm on the chromium layer.

One surface of a glass plate for a protective layer, having a thickness of 0.1 mm, was also provided with a polyimide layer having a thickness of approximately 0.1 µm. On this polyimide layer, a very small amount of fine silica particles having a diameter of approximately 1 µm was deposited, which served as a gap material.

The above-prepared two plates were both placed in a thermostatic chamber. The materials for the recording layer shown in Table 2 were fused, and the fused materials were each placed between these plates. This operation was conducted at temperatures higher than the melting point of each material by 10 to 20° C. After spreading out the fused material between the plates, a weight was placed uniformly on each of the protective layers. The temperature of the thermostatic chamber was gradually lowered so as to crystallize the materials for the recording layer. Thus, recording media Nos. 4 to 13 according to the present invention were produced each having the recording layer made of the thin-film-shaped crystals of each material shown in Table 2.

A semiconductor laser beam condensed to 1 µm in diameter was applied to each of the above-obtained recording media under the same conditions as in Example 2. The intensity of the laser beam varied depending on the material for the recording layer as shown in Table 2.

The resulting recording media were observed by using a polarizing microscope. As a result, it was confirmed that recorded lines equal to those formed in Examples 1 and 2 were formed in each recording medium.

TABLE 2

| Recording Medium | Materials of Recording Layer | Intensity of Recording Light (mW) |
|---|---|---|
| No. 4 | $CH_3(CH_2)_{26}COOH$ | 10 |
| No. 5 | $HOCO(CH_2)_{14}COOH$ | 14 |
| No. 6 | $CH_3(CH_2)_{16}COO(CH_2)_{17}CH_3$ | 7 |
| No. 7 | $CH_3(CH_2)_{16}CONH_2$ | 12 |
| No. 8 | $CH_3(CH_2)_{16}CONH-\text{C}_6\text{H}_5$ | 12 |
| No. 9 | $CH_3(CH_2)_{15}O-\text{C}_6\text{H}_4-COOH$ | 12 |

TABLE 2-continued

| Recording Medium | Materials of Recording Layer | Intensity of Recording Light (mW) |
|---|---|---|
| No. 10 | ⟨C₆H₅⟩—COO—⟨C₆H₄⟩—OCH₃ | 10 |
| No. 11 | CH₂=CH—(CH₂)₉O—⟨C₆H₄⟩—COO—⟨C₆H₄⟩—⟨C₆H₅⟩ | 12 |
| No. 12 | CH₃(CH₂)₉O—⟨C₆H₄⟩—⟨C₆H₄⟩—CN | 10 |
| No. 13 | CH₃(CH₂)₇O—⟨C₆H₄⟩—COO—⟨C₆H₄⟩—O(CH₂)₅CH₃ | 10 |

EXAMPLE 14

A glass disk comprising a chromium layer was prepared in the same manner as in Example 1. A 5 wt. % tetrahydrofuran solution of a vinylchloride-vinylacetate copolymer (Trademark "VYHH", made by Union Carbide Japan K.K.) was applied to the chromium layer, and then dried, thereby providing a resin layer having a thickness of approximately 0.2 μm on the chromium layer.

In a 10 wt. % tetrahydrofuran solution of stearic acid (made by Sigma Corporation, 99% or more of purity), a naphthalocyanine dye having the following formula was dissolved in an amount of 3 wt. % based on the amount of the stearic acid. The resulting solution was applied to the above-obtained resin layer, and dried at 45° C.

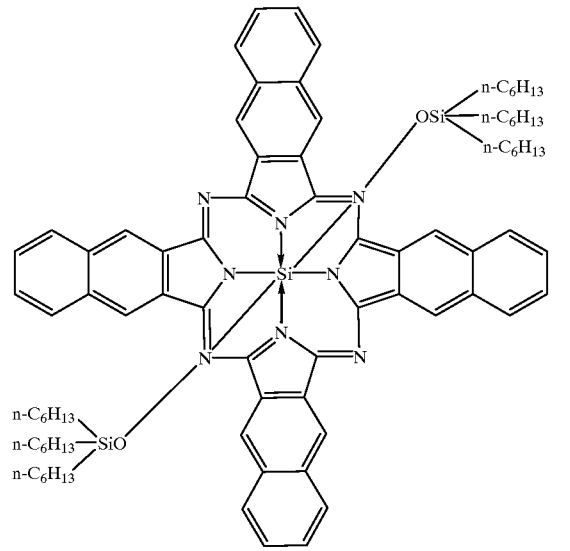

The resultant was subjected to a heat treatment at 90° C. for approximately 2 minutes, and then gradually cooled. Thus, a recording layer and a protective layer, each made of uniformly oriented thin-film-shaped crystals of stearic acid containing the naphthalocyanine dye, were prepared.

A semiconductor laser beam having a wavelength of 830 nm, condensed to 1 μm in diameter, was applied to the thus prepared recording medium No. 14 according to the present invention. The conditions for the irradiation were the same as conditions (1) in Example 1 except that the light intensity was changed from 5 mW to 3 mW.

The laser-light-applied part of the recording medium was observed using a polarizing microscope. As a result, the recorded area was clearly identified as in Example 1.

What is claimed is:

1. A recording method consisting essentially of the steps of:
   (a) recording information by applying light to a recording medium comprising a light-to-heat conversion layer capable of absorbing part or all of light applied thereto when recording is performed, and a recording layer consisting essentially of optically anisotropic thin-film-shaped crystals of an organic material to fuse said optically anisotropic thin film-shaped crystals, for recording information at high speed, said recording layer having a content of resin ranging from zero to an amount by weight not greater than the amount by weight of said organic material, and said organic material comprising as the main component a component selected from the group consisting of a fatty acid and a fatty acid derivative which is selected from the group consisting of esters and metal salts of a fatty acid; and
   (b) partially changing the crystalline state of said optically anisotropic thin film-shaped crystals by cooling the said recording layer, thereby to provide in said recording layer recorded information reproducible by detection of changes in light-polarizing characteristics of the recording layer.

2. The recording method as claimed in claim 1, wherein said partial change of the crystalline state includes changes in the orientation of the molecules of said organic material.

3. The recording method as claimed in claim 1, wherein said partial change of the crystalline state includes partial microcrystallization of said organic material.

4. A recording, reproducing and erasing method consisting essentially of the steps of:
   (a) recording information on a recording medium comprising a recording layer consisting essentially of optically anisotropic thin-film-shaped crystals of an organic material, said recording step consisting essentially of the steps of
  (i) recording information in said recording layer by heating the recording medium to a recording temperature at which said optically anisotropic thin film-shaped crystals are fused, said recording layer having a content of resin ranging from zero to an amount by weight not greater than the amount by weight of said organic material; and
  (ii) performing partial changing of the crystalline state of said optically anisotropic thin film-shaped crystals by cooling the said recording layer;
(b) reproducing the recorded information by detecting changes in light-polarizing characteristics of the recording layer; and
(c) heating said recording layer to an erasing temperature which is lower than said recording temperature, at which said optically anisotropic thin film-shaped crystals are not fused, but the molecules thereof can be thermally moved.

5. The recording reproducing and erasing method as claimed in claim 4, wherein said recording layer further comprises a light-to-heat conversion material capable of converting light to heat.

6. The recording reproducing and erasing method as claimed in claim 5, wherein said partial change of the crystalline state includes changes in the orientation of the molecules of said organic material.

7. The recording reproducing method as claimed in claim 5, wherein said partial change of the crystalline state includes partial microcrystallization of said organic material.

8. The recording method as claimed in claim 5, wherein said organic material comprises as the main component a component selected from the group consisting of a fatty acid and a fatty acid derivative which is selected from the group consisting of esters and metal salts of a fatty acid.

9. The recording reproducing and erasing method as claimed in claim 4, wherein said partial change of the crystalline state includes changes in the orientation of the molecules of said organic material.

10. The recording reproducing and recording method as claimed in claim 4, wherein said partial change of the crystalline state includes partial microcrystallization of said organic material.

11. The recording method as claimed in claim 4, wherein said organic material comprises as the main component a component selected from the group consisting of a fatty acid and a fatty acid derivative which is selected from the group consisting of esters and metal salts of a fatty acid.

12. A recording, reproducing and erasing method consisting essentially of the steps of:

(a) recording information on a recording medium comprising a light-to-heat conversion layer capable of absorbing part of all of light applied thereto when recording is performed, and a recording layer consisting essentially of optically anisotropic thin-film-shaped crystals of an organic material, said recording step consisting essentially of the steps of
  (i) recording information in said recording layer by applying light to said recording medium to heat said recording layer to a recording temperature at which said optically anisotropic thin film-shaped crystals are fused, said recording layer having a content of resin ranging from zero to an amount by weight not greater than the amount by weight of said organic material; and
  (ii) performing partial changing of the crystalline state of said optically anisotropic thin film-shaped crystals by cooling the said recording layer;
(b) reproducing the recorded information by detecting changes in light-polarizing characteristics of the recording layer; and
(c) heating said recording layer to an erasing temperature which is lower than said recording temperature, at which said optically anisotropic thin film-shaped crystals are not fused, but the molecules thereof can be thermally moved.

13. The recording reproducing and erasing method as claimed in claim 12, wherein said partial change of the crystalline state includes changes in the orientation of the molecules of said organic material.

14. The recording reproducing and erasing method as claimed in claim 12, wherein said partial change of the crystalline state includes partial microcrystallization of said organic material.

15. The recording method as claimed in claim 12, wherein said organic material comprises as the main component a component selected from the group consisting of a fatty acid and a fatty acid derivative which is selected from the group consisting of esters and metal salts of a fatty acid.

16. A recording medium consisting essentially of a substrate and a recording layer formed thereon consisting essentially of a component selected from the group consisting of a fatty acid and a fatty acid derivative which is selected from the group consisting of esters and metal salts of a fatty acid, which is in the form of thin-film-shaped crystals, said recording layer having a content of resin ranging from zero to an amount by weight not greater than the amount by weight of said component and containing no dye, said recording medium further comprising a light-to-heat conversion material capable of converting light to heat.

* * * * *